United States Patent [19]
Babcock et al.

[11] Patent Number: 5,340,644
[45] Date of Patent: Aug. 23, 1994

[54] ORGANOSILICON COMPOSITIONS

[75] Inventors: Laura M. Babcock; Richard L. Brady; Julia S. Burnier, all of New Castle County

[73] Assignee: Hercules Incorporated, Wilmington, Del.

[21] Appl. No.: 764,829

[22] Filed: Sep. 24, 1991

Related U.S. Application Data

[63] Continuation-in-part of Ser. No. 593,168, Oct. 5, 1990.

[51] Int. Cl.$^5$ .................. B32B 15/00; C08K 5/09; C08G 77/06
[52] U.S. Cl. .................. 428/285; 428/290; 428/447; 524/252; 524/588; 528/15
[58] Field of Search .................. 524/252, 588; 528/15; 428/285, 290, 447

[56] References Cited

U.S. PATENT DOCUMENTS

| | | | |
|---|---|---|---|
| 3,188,299 | 6/1965 | Chalk | 260/46.5 |
| 3,723,567 | 3/1973 | Mink et al. | 260/825 |
| 3,867,343 | 2/1975 | Garden | 260/46.5 UA |
| 4,374,967 | 2/1983 | Brown et al. | 528/15 |
| 4,584,361 | 4/1986 | Janik et al. | 528/15 |
| 4,791,186 | 12/1988 | Janik et al. | 528/15 |
| 4,801,642 | 1/1989 | Janik et al. | 524/714 |
| 4,877,820 | 10/1989 | Cowan | 523/222 |
| 4,900,779 | 2/1990 | Leibfried | 524/862 |
| 4,902,731 | 2/1990 | Leibfried | 523/222 |
| 5,004,792 | 4/1991 | Maxson | 528/15 |
| 5,008,360 | 4/1991 | Bard et al. | 528/25 |
| 5,013,809 | 5/1991 | Leibfried, Sr. | 524/862 |
| 5,025,048 | 6/1991 | Burnier | 524/99 |
| 5,077,134 | 12/1991 | Leibfried, Sr. | 428/447 |

FOREIGN PATENT DOCUMENTS 0259711 3/1988 European Pat. Off.

*Primary Examiner*—Melvyn I. Marquis
*Assistant Examiner*—Karen A. Dean
*Attorney, Agent, or Firm*—Mark D. Kuller

[57] ABSTRACT

A crosslinked organosilicon polymer or crosslinkable organosilicon prepolymer comprising:
(A) alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites;
(B) up to 85%, by weight, filler; and
(C) at least one reaction rate modifier selected from the group consisting of alkyl diamines, alkyl triamines, alkyl tetraamines and alkyl pentaamines.

50 Claims, 3 Drawing Sheets

ORGANOSILICON COMPOSITIONS

This application is a continuation-in-part of U.S. application Ser. No. 593,168, filed Oct. 5, 1990.

BACKGROUND OF THE INVENTION

1. Continuing Application Data
2. Field of the Invention

This invention is directed to novel organosilicon compositions based on (a) hydrocarbon residues derived from polycyclic polyenes and (b) residues derived from cyclic polysiloxanes or tetrahedral siloxysilanes.

3. Discussion of the Background and Material Information

Leibfried, in U.S. Pat. Nos. 4,900,779, 4,902,731, and 5,013,809 and U.S. patent application Ser. No. and 07/419,430 (filed Oct. 10, 1989), now U.S. Pat. No. 5,077,134, and Bard and Burnier, in U.S. Pat. No. 5,008,360, describe crosslinked organosilicon polymers and crosslinkable organosilicon prepolymers comprised of alternating polycyclic hydrocarbon residues and cyclic polysiloxanes or siloxysilane residues linked through carbon to silicon bonds. These polymers and prepolymers are useful in, among other things, structural and electronic applications.

It is often desired to store catalyst activated samples of the prepolymers for a long period of time, preferably at room temperature, or process the prepolymers at elevated temperatures without significant advancement or increased viscosity. For instance, when used as glob top encapsulants it is desired that these prepolymers be stable at room temperature so that they can be used over a long period of time without special handling. The instant inventors have discovered that filled crosslinked organosilicon polymers and crosslinkable organosilicon prepolymers have improved long term, room temperature storage stability and increased high temperature stability in the presence of certain alkylamine reaction rate modifiers. Other advantages are described below.

SUMMARY OF THE INVENTION

Accordingly, this invention is directed to a crosslinked organosilicon polymer or crosslinkable organosilicon prepolymer comprising:

(A) alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites;

(B) up to 85%, by weight, filler; and (C) at least one reaction rate modifier selected from the group consisting of alkyl diamines, alkyl triamines, alkyl tetraamines and alkyl pentaamines.

DETAILED DESCRIPTION OF THE INVENTION

Figure 1:
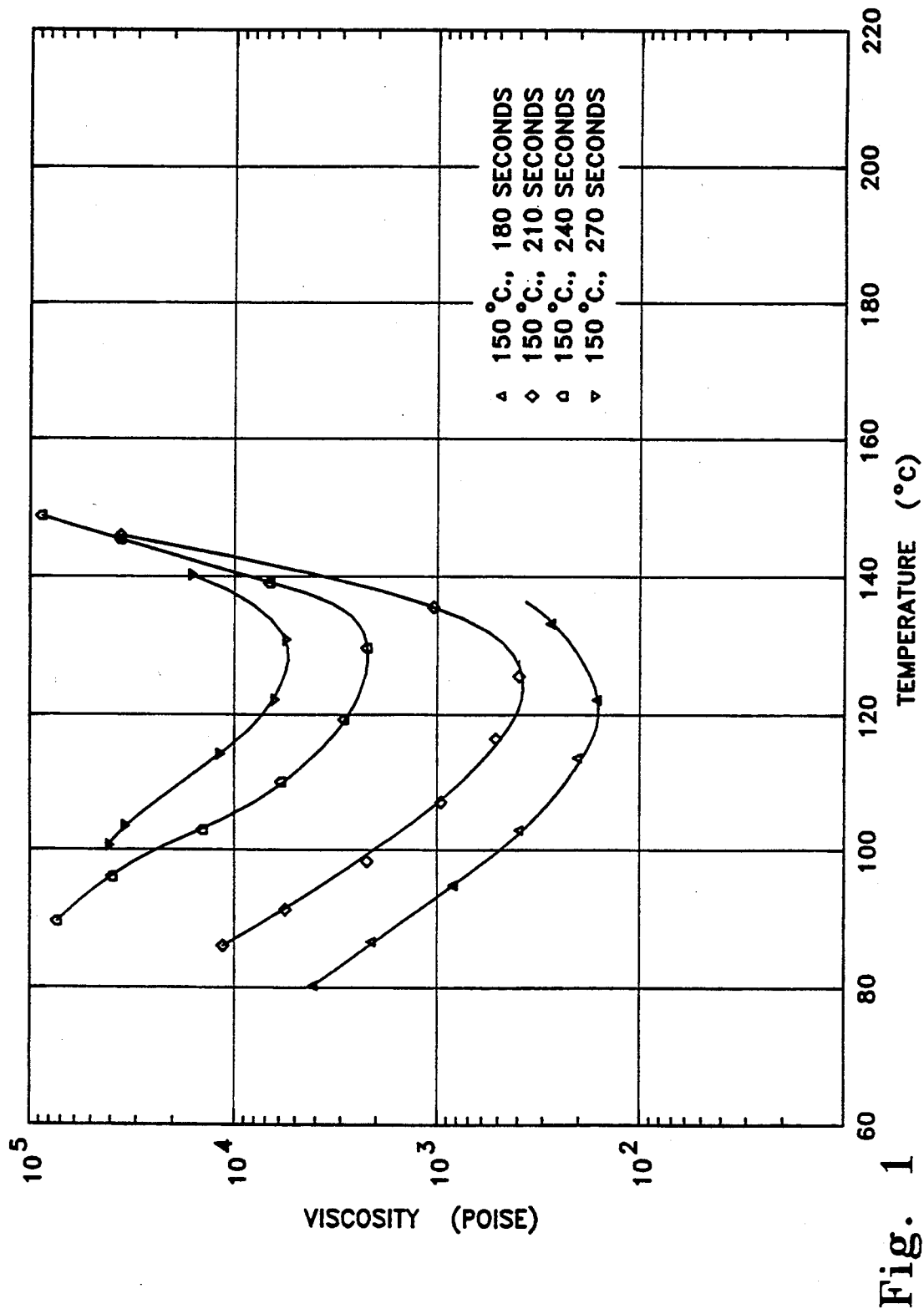
FIG. 1 shows viscosity profiles for samples of prepreg organosilicon prepolymers of the invention, incorporating sufficient alkylamine reaction rate modifier so as to raise the prepolymer gel times to 5'0" at 150° C., and being heated for different periods of time at 150° C. during prepreg fabrication.

Herein, "SiH" is used to describe hydrosilation reactable ≡SiH groups.

Any cyclic polysiloxane or tetrahedral siloxysilane with two or more hydrogen atoms bound to silicon can be used to form the crosslinked organosilicon polymer or hydrosilation crosslinkable organosilicon prepolymer (A) (a). Cyclic polysiloxanes useful in forming the products of this invention have the general formula:

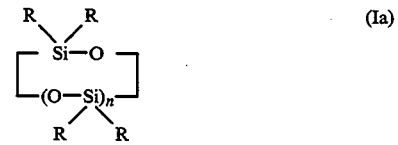

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

Examples of reactants of Formula (Ia) include, e.g., tetra- and penta-methylcyclotetrasiloxanes; tetra-, penta-, hexa- and hepta-methylcyclopentasiloxanes; tetra-, penta- and hexa-methylcyclohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopenta siloxane and 1,3,5,7,9,11-hexamethylcyclohexasiloxane, or blends thereof.

The tetrahedral siloxysilanes are represented by the general structural formula:

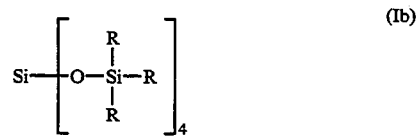

wherein R is as defined above and is hydrogen on at least two of the silicon atoms in the molecule.

Examples of reactants of Formula (Ib) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

Polymers and prepolymers made with cyclic polysiloxanes or tetrahedral siloxysilanes may also contain other hydrosilation reactable polysiloxanes bearing two or more SiH groups. For instance, they may contain linear, short chain SiH terminated polysiloxanes having the general formula:

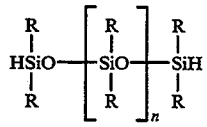

(II)

wherein n is 0 to 1000 and R is alkyl or aryl, preferably methyl or phenyl, as described by Leibfried in U.S. Pat. No. 5,018,809, and U.S. patent application Ser. No. 07/419,430, now U.S. Pat. No. 5,077,134, supra. These linear, short chain SiH terminated polysiloxanes impart flexibility to the cured polymers and can be used to produce elastomers.

Polycyclic polyenes useful in preparing the composition of this invention are polycyclic hydrocarbon compounds having at least two non-aromatic, non-conjugated, carbon-carbon double bonds. Illustrative are compounds selected from the group consisting of cyclopentadiene oligomers (e.g., dicyclopentadiene, tricyclopentadiene and tetracyclopentadiene), norbornadiene dimer, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadiene. Preferred are cyclopentadiene oligomers, such as dicyclopentadiene and tricyclopentadiene. Two or more polycyclic polyenes can be used in combination.

Other hydrocarbon compounds may also be used. For instance, according to one embodiment described in U.S. Pat. No. 5,008,360, supra, the hydrocarbon component comprises (a) at least one low molecular weight (typically having a molecular weight less than 1,000, preferably less than 500) polyene having at least two non-aromatic, non-conjugated, carbon-carbon double bonds highly reactive in hydrosilation (they may contain other less reactive (including unreactive) double-bonds, provided that those double bonds do not interfere with the reactivity of the highly reactive double bonds; but, compounds having only two highly reactive double bonds are preferred), the carbon-carbon double bonds being either in an alpha, beta or gamma position on a linear carbon moiety, next to two bridgehead positions in a strained polycyclic aliphatic ring structure, or in a cyclobutene ring, and (b) at least one polycyclic polyene having at least two chemically distinguishable non-aromatic, non-conjugated carbon-carbon double bonds in its rings. Examples of component (a) include 5-vinyl-2-norbornene, o-, m- or p-diisopropenylbenzene, o-, m- or p-divinylbenzene, diallyl ether, diallyl benzene, dimethanohexahydronaphthalene and the symmetrical isomer of tricyclopentadiene. By "having at least two chemically distinguishable carbon-carbon double bonds" it is meant that at least two carbon-carbon double bonds have widely different rates of reaction in hydrosilation and that one of the double bonds will react prior to substantial reaction of the other double bond(s). This first double bond must be quite reactive in hydrosilation. Reactive double bonds include those that are next to two bridgehead positions in a strained polycyclic aliphatic ring structure or in a cyclobutene ring, as per component (a) of the embodiment described directly above. The other carbon-carbon double bond(s) may be any other non-aromatic, 1,2-disubstituted non-conjugated carbon-carbon double bond that is not next to two bridgehead positions in a strained polycyclic aliphatic ring structure and is not in a cyclobutene ring. Exemplary are dicyclopentadiene and the asymmetrical isomer of tricyclopentadiene. Preferred, for some applications, when using these hydrocarbon compounds are cyclic polysiloxanes containing three or more SiH groups.

The reactions for forming the organosilicon prepolymers and polymers of this invention are described in U.S. patent application Ser. No. 07/419,430, now U.S. Pat. No. 5,077,134, and U.S. Pat. Nos. 4,900,779, 4,902,731, 5,008,360, and 5,013,809, supra. The reactions for forming the prepolymer and for forming a polymer from the prepolymer can be promoted thermally or by the addition of a hydrosilation catalyst or radical generators such as peroxides and azo compounds. Hydrosilation cure catalysts used with this invention are metal based and include metal salts and complexes of Group VIII elements. The preferred hydrosilation catalysts contain platinum (e.g., divinyltetramethyldisiloxane platinum complex, bisbenzoni-trileplatinumdichloride, cyclooctadieneplatinumdichloride, dicyclopentadiene-platinumdichloride, chloroplatinic acid, $PtCl_2$, platinum on carbon, etc.). The preferred catalyst, in terms of both reactivity and cost, is chloroplatinic acid. Catalyst concentrations of 0.0005 to about 0.05% by weight of platinum, based on the weight of the monomers, are preferred.

To prepare the thermoset and thermoplastic polymers, several approaches are available. It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

In one approach, the correct relative ratios of reactants and the platinum catalyst are simply mixed and brought to a temperature at which the reaction is initiated and proper temperature conditions are thereafter maintained to drive the reaction to substantial completion (typically, with a ratio of carbon-carbon double bonds to SiH groups of about 1:1, when 70 to 90% of the SiH groups are consumed).

Generally, with cyclic polysiloxanes or tetrahedral siloxysilanes, thermoset polymers result when the ratio of carbon-carbon double bonds of (b) to SiH groups in (a) is in the range of from about 0.5:1 up to about 1.3:1, more preferably from about 0.8:1 up to about 1.1:1. The alternating residues form a cross-linked thermoset structure.

B-stage type prepolymers can be prepared as disclosed in U.S. Pat. Nos. 4,902,731 and 5,008,360, supra. Generally, the initial product of the reaction at lower temperatures, e.g., about 25° to about 80° C., is a cross-linkable prepolymer, which may be in the form of a solid or a flowable, heat-curable liquid, even though the ratio of carbon-carbon double bonds to SiH groups is otherwise suitable for cross-linking. The prepolymers generally have 30 to 70% of the SiH groups reacted, and when liquids are desired preferably about 30 to 60% of the SiH groups reacted. Such prepolymers, analogous to the so-called B-stage resins encountered in other thermoset preparations, can be recovered and subsequently transferred to a mold for curing.

These prepolymers are prepared using polycyclic polyenes having at least two chemically distinguishable non-aromatic, non-conjugated carbon-carbon double bonds in their rings. Illustrative are compounds selected from the group consisting of dicyclopentadiene, asymmetrical tricyclopentadiene, and methyl dicyclopentadiene, and substituted derivatives of any of these. Preferred is dicyclopentadiene. Such prepolymers can also be prepared with the hydrocarbon combinations described in U.S. Pat. No. 5,008,360, supra.

The prepolymers, including the viscous, flowable liquid prepolymers, are stable at room temperature for varying periods of time, and cure upon reheating to an appropriate temperature, e.g., about 100° to about 250° C. Often, additional catalyst is added to the prepolymer prior to cure to further promote the reaction.

A second type of prepolymer can be prepared by a process described in U.S. patent application Ser. No. 07/419,430, U.S. Pat. No. 5,077,134, and U.S. Pat. No. 5,013,809, supra. In this process, an olefin rich prepolymer is prepared by reacting a large excess of polycyclic polyenes with cyclic siloxanes or tetrahedral siloxysilanes. The olefin rich organosilicon prepolymer is blended with additional cyclic polysiloxane or tetrahedral siloxysilane before cure.

According to this process, organosilicon prepolymers are made with a large excess of carbon-carbon double bonds available for reaction with SiH groups. That is, the ratio of carbon-carbon double bonds in the rings of the polycyclic polyenes used to form the polycyclic polyene residues (b) to SiH groups in the cyclic polysiloxanes and tetrahedral siloxysilanes used to form the cyclic polysiloxane or tetrahedral siloxysilane residues (a) is greater than 1.8:1, preferably greater than 1.8:1 and up to 2.2:1.

The prepolymers of this embodiment are generally in the form of flowable liquids, which are stable at room temperature. The most stable prepolymers are formed at a double bond to SiH ratio of about 2:1 since virtually all polyene is reacted and excess polycyclic polyene need not be removed. (Due to their odor, the presence of unreacted polycyclic polyenes is undesirable. When necessary or desirable, unreacted polycyclic polyenes can be stripped, e.g., using a rotoevaporator, to form odorless compositions.)

Later, crosslinked polymers are formed by mixing the prepolymers with the polysiloxanes/siloxysilanes such that the total ratio of non-aromatic, non-conjugated carbon-carbon double bonds in the rings of the polycyclic polyenes used to form the polycyclic polyene residues (b) to SiH groups in the polysiloxanes and siloxysilanes used to form the polysiloxane/siloxysilane residues (a) is in the ratio of 0.4:1 to 1.7:1; preferably 0.8:1 to 1.3:1, most preferably about 1:1, and curing the mixture in the presence of a hydrosilation catalyst.

Preferably, according to this embodiment, the organosilicon prepolymers are reacted with the polysiloxanes and/or siloxysilanes to form a crosslinked polymer in a mold. The prepolymers and polysiloxanes/siloxysilanes are stored separately and are blended before entering the mold. The hydrosilation catalyst may be present in either or both stream(s) or injected directly into the mixer. The reaction is exothermic and proceeds rapidly so that the polymer gels and the product can be removed from the mold in minutes. The components of the blends are completely stable until they are mixed. This permits indefinite ambient storage of the materials.

Alternately, the blend components can be premixed and stirred in a tank. These blends have low viscosity and are pumpable. Addition of catalyst and/or application of heat can be used to cure the prepolymer composition. The reaction may be carried out in an extruder, mold or oven, or the blend may be applied directly on a substrate or part.

A number of options exist for incorporating additives into the prepolymers or polymers of this invention. Additives such as fillers and pigments are readily incorporated. Useful fillers include carbon black, vermiculite, mica, wollastonite, calcium carbonate, silica, fused silica, fumed silica, glass spheres, glass beads, ground glass, glass flakes, waste glass and fiber reinforcements, such as those described in U.S. Pat. Nos. 4,900,779 and 4,902,731. Typical fibrous reinforcements include but are not limited to chopped glass, woven glass, nonwoven glass, and other typical composite fibers, such as ceramic, carbon (e.g., graphite), metallic and synthetic polymer fibers. Fillers can serve either as reinforcement or as fillers and extenders to reduce the cost of the molded product. Two or more fillers may be used in combination. When used, fillers can be present in amounts up to about 85%. The fiber reinforcements are preferably present in the amount of 30 to 60% by weight. Encapsulants normally contain high levels of fillers, preferably silica, fumed silica or fused silica, most preferably fused silica, in amounts of 60% to 85%.

An elastomer can be added to improve toughness. Preferred are hydrocarbon elastomers. Preferred are ethylene-propylenedicyclopentadiene and ethylene-propylene-ethylidenenorbornene polymers having a molecular weight of 5500 to 7000. Most preferred is Trilene 65 elastomer (Uniroyal, Middlebury, Conn.). Elastomers are generally used in an amount of 0.5 to 20%, preferably 3 to 12%, and most preferably 5 to 10%, by weight of the total composition. Elastomers may be added to the monomers or to a prepolymer.

The prepolymers, prepregs, polymers, etc., are usually prepared with from 0.5 to 3.0 weight % of an antioxidant to protect the prepolymer from oxidizing during formation of the prepreg, during final cure, and also to protect the final product during use, for example, as a printed circuit board. Preferred are bis(1,2,2,6,6-pentamethyl-4-piperidinyl)-(3,5-di-tert-butyl-4-hydroxybenzyl)butylpropanedioate, (available as Tinuvin ™ 144 from Ciba-Geigy Corp., Hawthorne, N.Y.) or a combination of octadecyl 3,5-di-tert-butyl-4-hydroxyhydrocinnamate (also known as octadecyl 3-(3',5'-di-tert-butyl-4'-hydroxyphenyl)propionate), available as Naugard ™ 76 from Uniroyal Chemical Co., Middlebury, Conn.) and bis(1,2,2, 6,6-pentamethyl-4-piperidinylsebacate) (available as Tinuvin 765 ™ from Ciba-Geigy Corp.).

The compounds useful as reaction rate modifiers of this invention are alkyl diamines and alkyl triamines. Preferred are those having the formulae:

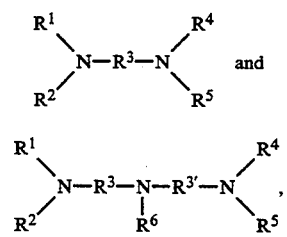

wherein $R^1$, $R^2$, $R^4$, $R^5$ and $R^6$ each represent a hydrogen or an alkyl radical having 1 or 2 carbon atoms. In the case where $R^2$ and $R^4$ are alkyl radicals having 2 carbon atoms it is preferred that $R^1$ and $R^5$ be hydrogen. $R^3$ and $R^{3'}$ represent an alkene radical containing from 1 to 4 carbon atoms. Preferably both $R^3$ and $R^{3'}$ are ethylene. Reaction rate modifiers which meet these criteria include, but are not limited to, ethylenediamine, N,N'-dimethylethylenediamine, N,N'-diethylethylenediamine, N,N,N',N'-tetramethylethylenediamine (TMEDA), and diethylenetriamine (DETA). Higher order alkylamines, such as alkyl tetraamines and alkyl pentaamines will function in a similar manner.

The level of prepolymer stability obtained with this invention depends on the specific alkylamine used and the relative concentration of the retardant with respect to the catalyst. The alkylamine reaction rate modifiers are generally present in an amount from 0.0001 weight % to 1 weight %, preferably between 0.0005 weight % and 0.5 weight %, and most preferably between 0.001 weight % and 0.1 weight %. Throughout this application, unless otherwise specified, the weight percentage of reaction rate modifier is relative to the neat prepolymer.

The polymers of this invention have excellent electrical insulating properties and resistance to moisture. Often, they have high glass transition temperatures.

The polymers and prepolymers of this invention are well-suited for electronic applications, e.g., composites, adhesives, encapsulants, potting compounds and coatings. They are especially useful for preparing laminates, such as those used for printed circuit boards, and glob top encapsulants and molding compounds for encapsulation.

The alkylamine reaction rate modifiers of this invention are used to:

a. improve long term, room temperature storage stability of the filled prepolymers;

b. tailor the viscosity profile when laminating prepregs, or when dispensing and curing filled formulations for encapsulants;

c. allow elevated temperature solvent stripping and degassing of viscous prepolymers, including filled prepolymers and blends;

d. make new chemical formulations possible by allowing additives to be mixed in at higher temperatures; and e. allow higher levels of catalyst in the filled prepolymers without premature reaction.

The use of the reaction rate modifiers allows normal cure at elevated temperatures and does not affect properties such as modulus, strength, toughness, glass transition temperature and thermal expansion.

One major advantage of the use of the reaction rate modifiers of this invention, is the ability to prepare room temperature stable prepolymer compositions having high levels of fillers, such as silica, fused silica and fumed silica, which are useful as glob top encapsulants and molding compounds for encapsulation.

Another major advantage of these alkylamines pertains to their function of tailoring the viscosity profile in prepreg applications. As one aspect, they can be used to control the rheology of prepregs incorporating the prepolymers of this invention—particularly, so as to match that of specific other prepolymers.

Figure 2:
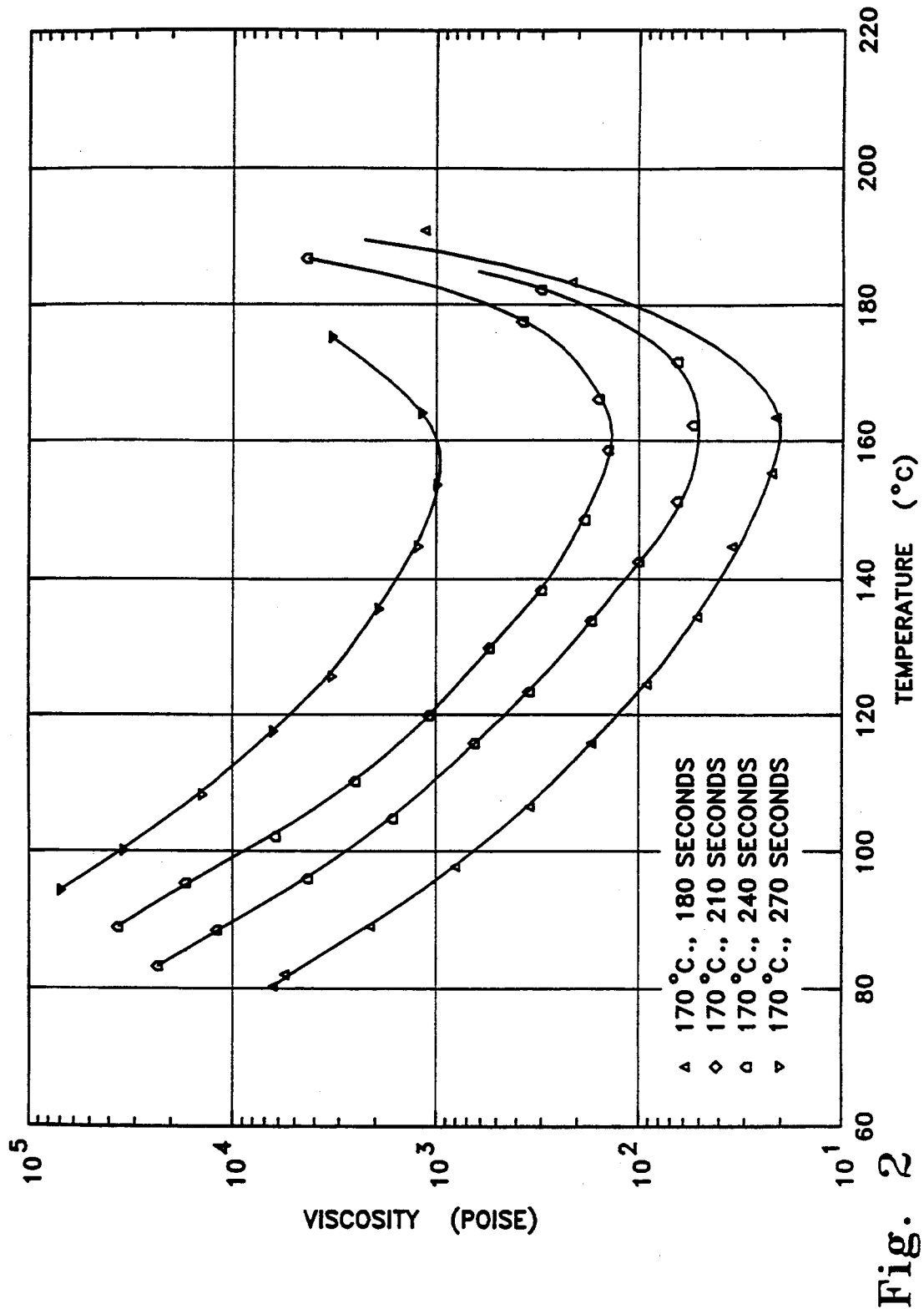
FIG. 2 shows viscosity profiles for such prepolymers, also being heated for different periods of time, but incorporating a greater amount of amine—i.e., a proportion sufficient to raise gel time to 5'0" at 170° C.—and being heated at 170° C. during prepreg fabrication.
Figure 3:
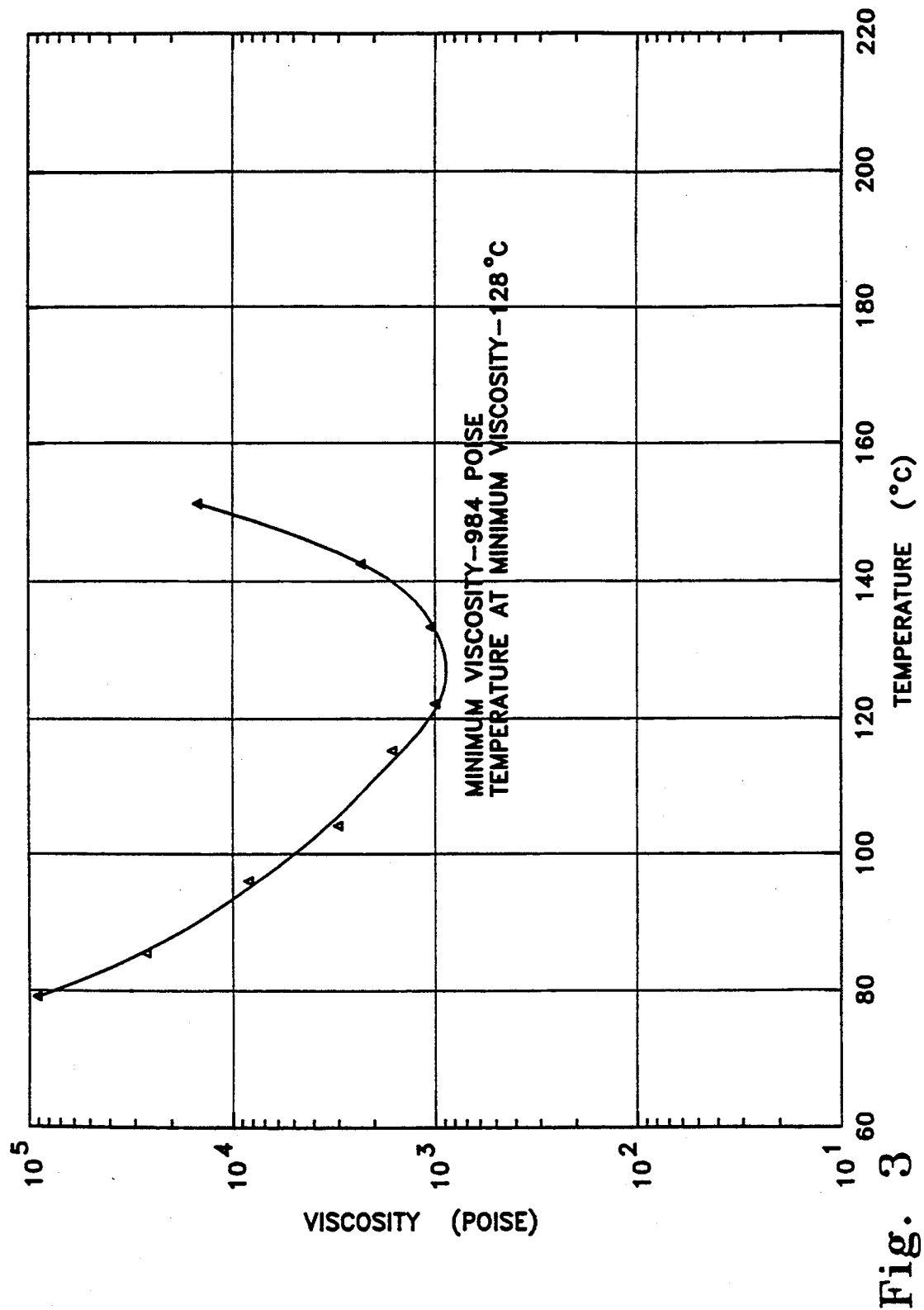
FIG. 3 shows the viscosity profile for a typical epoxy prepreg resin.

On this matter, inherent to the prepolymers as discussed herein, including the organosilicon prepolymers of the invention, is a feature identified herein by the term "viscosity profile," which includes a point identified herein by the term "minimum viscosity." Specifically, in the presence of the hydrosilation catalyst, subjecting the prepolymer to progressively higher temperatures will cause the prepolymer viscosity to drop correspondingly. At the same time, the progressively higher temperature causes the prepolymer to increase in molecular weight, with this molecular weight increase causing an increase in viscosity. This relationship between temperature and viscosity is the indicated viscosity profile. Graphed as a function of such temperature and viscosity, it takes the form of a curve, as is seen in FIGS. 1-3, which show several viscosity profiles. The temperature at the point of minimum viscosity in this viscosity profile is that temperature at which the influence of increasing molecular weight is greater than the influence of increasing temperature; this point can also be referred to as the "hinge point."

Preparation of the prepreg of the invention has a particular effect upon such prepolymer viscosity profile. As set forth in U.S. Pat. No. 5,008,360, supra, preparation of the prepreg can include subjecting the prepolymer-impregnated fibrous reinforcement to heat. Heating at a sufficient temperature, with hydrosilation catalyst present, will continue the hydrosilation reaction of the prepolymer.

The longer such treatment is continued, the higher the prepolymer molecular weight, and the less the prepolymer will flow during any subsequently initiated heating process. The effect on the previously discussed viscosity profile is that, at each temperature increment, the viscosity has been raised as a result of such treatment. The temperature at which minimum viscosity occurs is not changed by such treatment, but the minimum viscosity which occurs at this temperature has been raised.

Viscosity profile is a crucial factor with respect to the formation of laminates of the invention. In the manner as set forth in U.S. Pat. No. 5,008,360, supra, such laminates are formed by subjecting multiple prepreg plies to heat and pressure; a laminate may also be formed from a single prepreg. If a void-free, well-consolidated laminate is to be obtained from this lamination process, the prepolymer component of the prepreg must have the proper flow characteristics during the press cycle.

Specifically, as the prepreg is heated, the viscosity of the prepolymer must drop enough, and for long enough, for trapped solvent and air to diffuse to the edge of the laminate. If the viscosity does not reach a low enough value, solvent and air can be trapped in the laminate, which may therefore be "dry" or not well consolidated, resulting in reduced interlaminar strength and increased moisture absorption.

If, on the other hand, the prepolymer resin viscosity is too low, then too much flow is obtained during lamination, and the resulting laminate will have inadequate resin content. This will have a deleterious effect on interlaminar strength, moisture absorption, and electrical properties.

The lamination procedure used depends upon the viscosity profile of the prepolymer component in the prepreg. Specifically, the temperature at which minimum viscosity occurs determines the temperature at which pressure must be exerted in a lamination press cycle; i.e., pressure must be exerted before the resin becomes too viscous to effect efficient removal of trapped air or solvent.

Lamination presses are used for making laminates from a number of different polymers. The viscosity profiles of the prepolymers disclosed in U.S. Pat. Nos. 4,902,731 and 5,008,360, supra, exhibit their minimum viscosities at temperatures significantly lower than those of commonly used prepregging resins, such as epoxies and polyimides. The process parameters of prepreg lamination being viscosity profile-dependent, polymers with different viscosity profiles cannot be laminated together. The difference in viscosity profiles pertains to the viscosity profiles of different polymers being distinguished by virtue of their minimum viscosities occurring at different, or significantly different, temperatures. This is the factor which prevents prepregs having such different polymers from being laminated together. Accordingly, a significant advantage is to be achieved if the viscosity profile of one prepreg polymer component can be controllably modified in this context—i.e., shifted so that its minimum viscosity occurs at a different temperature, particularly a higher temperature, and, most specifically, so as to match the viscosity profile of another polymer in this respect. In such instance—i.e., where their minimum viscosities occur at the same, or substantially the same temperature—multiple polymers can be subjected to lamination in a single press cycle.

With respect to these points, a significant aspect of this invention is control of the rheology, or viscosity profile, of the prepreg prepolymer—i.e., the ability to shift viscosity profile so that minimum viscosity occurs at a different temperature, preferably a higher temperature. This control is effected with reaction rate modifiers, particularly for inhibiting catalyst activity. The reaction rate modifiers preferred for use with such prepolymers and prepregs are the alkylamines, especially the alkyl diamines and alkyl triamines.

The addition of reaction rate modifiers to the prepolymers and prepregs of the invention, shifts their viscosity profiles so as to increase the temperature at which their minimum viscosities occur. Generally, the greater the amount of reaction rate modifier present, the further the shift in viscosity profile—i.e., the higher the temperature at which minimum viscosity occurs.

Further, with respect to the matter of viscosity profile, the invention pertains generally to the organosilicon prepolymers disclosed herein, and to the prepregs incorporating such prepolymers, having viscosity profiles characterized by minimum viscosities occurring at a temperature equal to or greater than 105° C.; preferably, such minimum viscosities occur within a temperature range of 105° C. to about 170° C. More preferably, the temperature range within which such minimum viscosity occurs is 110° C. to about 150° C., and, most preferably, the temperature range is 120° C. to 140° C.

To achieve a minimum viscosity within the forgoing temperature ranges, the ranges for an alkyl triamine reaction rate modifier, such as diethylene triamine, should be incorporated at at least 0.0005 weight %, preferably 0.001 weight % to 0.02 weight %, more preferably 0.002 weight % to 0.01 weight %, and most preferably 0.003 weight % to 0.006 weight %, respectively. The amount of the reaction rate modifier will vary with molecular weight and functionality. If no such modifier is added, the prepregs shown in U.S. Pat. Nos. 4,902,731 and 5,008,360, supra, would be expected to have prepolymers with minimum viscosities in the range of 90° C. to 100° C.

The amount of alkylamine reaction rate modifier can also be defined in terms of what is needed to delay the prepolymer gel time to a particular gel point, at a specific temperature.

In this regard, where an organosilicon prepolymer of this invention, once prepared, is then subjected to further catalysis,—i.e., in the presence of hydrosilation catalyst—until its gel point is raised, for instance, to 5'0" at 130° C., then the resulting prepolymer, upon full cure, will yield a product having the desired high glass transition temperature ($T_g$).

When an organosilicon polymer of this invention was thusly catalyzed—i.e., to the gel point of 5'0" at 130° C.—addition of sufficient alkyl triamine reaction rate modifier to delay the gel point to 5'0" gel time at 150° C. raised the minimum viscosity temperature range to 120–140° C. Sufficient modifier to cause further delay—to a 5'0" gel time at 170° C.—provided a yet higher minimum viscosity temperature range, of 150–165° C. The amounts of alkyl triamine reaction rate modifier utilized to provide these results were 0.003–0.006 weight %, and 0.0065–0.015 weight %, respectively.

The proportions, as variously defined above, are provided only as general ranges; the particular amount of reaction rate modifier to be added, to achieve a particular viscosity profile shift, depends upon a variety of factors—these factors include the molecular weight of the modifier, and can further include the amount and identity of the hydrosilation catalyst, and the composition of the organosilicon prepolymer. However, the requisite proportions of the various components, to achieve the desired viscosity profile shift, can be readily determined by one of ordinary skill in the art, without undue experimentation.

Such incorporation of alkylamine reaction rate modifier, to attain the foregoing shifts in viscosity profile, is indeed an aspect of the invention. However, as to the scope of the invention, it is further emphasized that, as broadly considered, the invention also generally encompasses the indicated prepolymers and prepregs, characterized by minimum viscosities within the foregoing temperature ranges, without limitation as to particular means for achieving such results—e.g., by the addition of alkylamine reaction rate modifier.

In terms of modifying viscosity profile to allow simultaneous lamination of different polymers, this invention is particularly significant with respect to epoxy resins and prepregs. Epoxy prepregs are extensively employed to prepare laminates used for printed circuit boards; typical difunctional and tetrafunctional epoxy prepreg prepolymers for such applications have a minimum viscosity in the range of 120–140° C.

Where the organosilicon prepolymers and prepregs of the present invention are characterized by the previously discussed 90–100° C. minimum viscosity temperature range, the disparity, with respect to such epoxy prepolymers and prepregs, precludes simultaneous lamination with these two polymers. Accordingly, modification of such organosilicon prepolymers and prepregs, so that their rheology (i.e., viscosity profile, or, more specifically, minimum viscosity temperature range) matches that of such epoxy prepolymers and prepregs provides a specifically significant advantage, in enabling organosilicon and epoxy prepregs to be used in the same lamination cycle. Particularly, considering the extensive lamination activity conducted with epoxy prepregs, the advantage is that operations for such prepregs need not be interrupted so that the equipment may be separately employed for organosilicon prepregs of the invention. Rather, organosilicon prepregs of the invention can simply be added to press cycles for the epoxy prepregs.

Yet another advantage of the use of reaction rate modifier is the reduction of tack without adversely affecting the flow properties of the prepreg prepolymer.

Reduction of tack facilitates handling and storage of prepregs.

The following examples are presented to demonstrate this invention. They are not intended to be limiting. Therein, all percentages, parts, etc., are by weight unless otherwise indicated.

The activated prepolymer solutions utilized in Examples 1–5 were prepared using the following procedures.

Catalyst solution A was prepared by adding 146.74 parts dicyclopentadiene and 1.51 parts chloroplatinic acid to a glass container. The mixture was heated with stirring at 70° C. for 1 hour and cooled to room temperature.

Catalyst solution B was prepared by dissolving a commercially available divinyltetramethyldisiloxane platinum complex in toluene to give a solution which was 0.23 weight % platinum.

Reaction solution A was prepared by combining 125.02 parts methylhydrocyclosiloxane, 3.77 parts octadecyl 3,5-di-tert-butyl-4-hydroxyhydrocinnamate (antioxidant) and 0.77 parts bis(1,2,2,6,6-pentamethyl-4-piperidinylsebacate) 15 (antioxidant).

Reaction solution B was prepared by combining 127.01 parts dicyclopentadiene, 3.33 parts catalyst solution A and 65.02 parts toluene. This mixture was heated with stirring at 50° C. for 1 hour and cooled to room temperature.

The prepolymer was prepared by heating reaction solution A to 70° C. in a suitable glass reaction vessel. Reaction solution B was added dropwise to reaction solution A with stirring to maintain a reaction temperature of 70–80° C. The mixture of the two solutions was heated to 70° C. for 1 hour after the addition was complete. The reaction to prepare prepolymer was complete when proton NMR spectroscopy showed that all the norbornene double bonds of dicyclopentadiene were reacted. The prepolymer was activated by adding 10–20 ppm platinum as catalyst B to give a gel time of 1 minute 22 seconds at 160° C.

Example 1

This example demonstrates the ability of the alkylamine reaction rate modifiers to improve the storage stability of prepolymer with no reduction in the glass transition temperature, Tg, of the cured polymer.

The solvent was removed from the activated prepolymer prepared as described above on a rotary evaporator at 40° C. for 1 hour at 10 mm Hg. This sample was divided into three portions; a control with no alkylamine added, a sample where tetramethylethylenediamine was added as a 0.06M solution in toluene to give a nitrogen/platinum mole ratio of 2.2 in the sample, and a sample where diethylenetriamine was added as a 0.06M solution in toluene to give a nitrogen/platinum ratio of 3.3 in the sample. Each sample was divided into two portions. One portion was cured at 160° C. for 1 hour followed by a 4 hour postcure at 250° C. The Tg of the cured sample was measured by thermal mechanical analysis, TMA, on a Model No. 942(A) Thermal Mechanical Analyzer (E.I. Du Pont de Nemours, Wilmington, Del.). The other portion was monitored for room temperature viscosity change over a period of 1.5 months. The results are shown in Table I. Viscosity results are reported in centipoise (cp).

TABLE I

| Retarder | Initial Viscosity (cp) | Viscosity After 1.5 Months (cp) | Tg °C. |
|---|---|---|---|
| None | 5410 | gelled in 2 weeks | 141 |
| Tetramethyl-ethylenediamine | 4057 | 4725 | 157 |
| Diethylene-triamine | 3893 | 4125 | 147 |

Table I shows the viscosity change of unfilled prepolymers over 1.5 months at room temperature and Tg's for the three samples described. Both tetramethylethylenediamine and diethylenetriamine added as reaction rate modifiers provide long term storage stability to the prepolymer without sacrificing polymer properties.

Example 2

This example demonstrates the ability of alkylamines to alter the cure of the prepolymer.

The solvent was removed from the activated prepolymer prepared as described above (prior to Example 1) on a rotary evaporator at 50° C. for 1 hr at 10 mm Hg. Various nitrogen containing compounds were added to 5 gram aliquots of the prepolymer as 0.03M or 0.06M solutions in toluene. The amount of the nitrogen containing compound added to the various samples was controlled to give a desired ratio of nitrogen to platinum (N/Pt ratio). The samples were tested by differential scanning calorimetry, DSC, Model No. 2100/912 Differential Scanning Calorimeter (E.I. Du Pont de Nemours, Wilmington, Del.) in closed pans under nitrogen with a scan rate of 10° C./minute. The results are shown in Table II.

TABLE II

| Retarder | N/Pt Ratio | Peak Temp. °C. |
|---|---|---|
| None | 0/1 | 155.6 |
| Ethylenediamine | 2/1 | 168.5 |
| N,N'-dimethylethylene-diamine | 2/1 | 173.2 |
| N,N,N',N'-tetramethyl-ethylenediamine | 2/1 | 173.2 |
| Diethylenetriamine | 3/1 | 181.7 |
| Diethylenetriamine | 6.6/1 | 221.0 |
| N,N'-diethylethylene-diamine | 2/1 | 169.1 |
| N,N,N',N'-tetraethyl-ethylenediamine | 2/1 | 155.4 |
| Pyridine | 2/1 | 156.9 |
| Diproplyamine | 2/1 | 153.8 |
| Tripropylamine | 2/1 | 156.7 |

Table II lists the observed peak reaction temperatures obtained during cure of the polymer. The presence of the nitrogen compounds, such as tetramethylethylenediamine and diethylenetriamine, shifted the cure to higher temperatures indicating these compounds retard the cure reaction. The magnitude of the temperature shift depended on the reaction modifier used and the concentration.

Example 3

This example demonstrates the ability of alkylamines to alter the cure of filled prepolymer.

The solvent was removed from the activated prepolymer prepared as described above (prior to Example 1) on a rotary evaporator at 40° C. for 1 hour at 10mm Hg. Fused silica (−325 mesh) was added to the stripped prepolymer at 24 weight %. This filled prepolymer sample was divided into several 5.6 gram aliquots and each was treated with an alkylamine, as 0.06M solutions in toluene, to give a specific nitrogen to platinum ratio (N/Pt ratio). The samples were tested by DSC as described in Example 2. The results are shown in Table III.

TABLE III

| Retarder | N/Pt Ratio | Peak Temp. °C. |
|---|---|---|
| None | 0/1 | 151.7 |
| N,N,N',N'-tetramethyl-ethylenediamine | 2/1 | 159.4 |
| Diethylenetriamine | 3/1 | 166.7 |
| Triethylamine | 2/1 | 149.7 |
| Propylamine | 2/1 | 149.9 |

Table III lists the observed peak reaction temperatures obtained during filled polymer cure. The presence of the alkylamine reaction rate modifiers of this invention shifts the cure to higher temperatures indicating these compounds retard the cure reaction. This example illustrates that the alkyl diamines and triamines effectively modify the cure rate of filled prepolymer samples. The monoamines such as triethylamine and propylamine did not modify the rate of the cure reaction.

Example 4

This example demonstrates improved storage stability of a filled prepolymer in the presence of alkylamines.

The activated prepolymer prepared as described above (prior to Example 1) was combined with 5 weight % Trilene 65 rubber and divided into three portions; a control with no alkylamine added, a sample containing tetramethylethylenediamine (0.01 weight %), and a sample containing diethylenetriamine (0.01 weight %). The solvent was removed from the prepolymer in a vacuum oven 10 mm Hg at 50° C. for 1 hour. Fused silica (−325 mesh, 30 weight %) was added to each sample. The filled samples were degassed for 5 minutes at 50° C. in the vacuum oven to remove trapped air. Room temperature viscosity was monitored over 15 days. The results are shown in Table IV.

TABLE IV

| Retarder | Room Temp. Viscosity Initial (cp) | Room Temp. Viscosity after 5 days (cp) |
|---|---|---|
| None | 2320 | 32,000 |
| N,N,N',N'-tetramethyl-ethylenediamine | 2430 | 3,050 |
| Diethylenetriamine | 2690 | 2,820 |

The data in Table IV demonstrate that the presence of small amounts of the preferred alkylamines greatly enhances the viscosity stability of the filled prepolymer.

Example 5

This example demonstrates the improved viscosity stability at 100° C. of filled prepolymers with alkylamines.

The activated prepolymer prepared as described above (prior to Example 1) was combined with 5 weight % Trilene 65 rubber and divided into two portions; a control with no alkylamine added and a sample containing diethylenetriamine (0.005 weight %). The solvent was removed from the prepolymer in a vacuum oven under 10 mm Hg at 50° C. for 1 hour. Fused silica (−325 mesh, 65 weight %) was added to each sample. The filled samples were degassed for 10 minutes at 100° C. in the vacuum oven to remove trapped air. The viscosity of the samples versus time was monitored. The results are shown in Table V. Viscosity results are reported in poise.

TABLE V

| Retarder | Initial Viscosity at 100° C. (poise) | Viscosity after 60 minutes at 100° C. |
|---|---|---|
| None | 19 | 8,800 |
| Diethylenetriamine | 8 | 20 |

The data in Table V demonstrate that the presence of small amounts of the preferred alkylamines greatly enhances the viscosity stability of the filled prepolymer at 100° C.

The prepolymer solutions utilized in Examples 6 and 7 were prepared using the following procedures.

Catalyst solution A' was prepared by adding 0.5245 parts chloroplatinic acid to 174.83 parts dicyclopentadiene to a glass container. The mixture was heated with stirring at 70° C. for 1 hour and then cooled to room temperature.

Catalyst solution B' was prepared by dissolving a commercially available divinyltetramethyldisiloxane platinum complex in toluene to give a solution which was 1.48 weight % platinum.

Reaction solution A' was prepared by combining 276.7 parts methylhydrocyclosiloxanes, a blend of about equal amounts of 1,3,5,7-tetramethylcyclotetrasiloxane and 1,3,5,7,9-pentamethylcyclopentasiloxane, 13.13parts octadecyl 3,5-di-tert-butyl-4-hydroxyhydrocinnamate (antioxidant) and 2.63 parts bis (1,2,2,6,6-pentamethyl-4-piperidinylsebacate) (antioxidant).

Reaction solution B' was prepared by combining 365.01 parts of a dicyclopentadiene/tricyclopentadiene blend (50% tricyclopentadiene by weight, with the tricyclopentadiene containing both symmetrical and asymmetrical isomers), 2.53 parts of catalyst solution A', and 67.29 parts toluene; blends of dicyclopentadiene and tricyclopentadiene, with the tricyclopentadiene containing both symmetrical and asymmetrical isomers, are preferred for the prepregs of the invention.

The prepolymer was prepared in solution, by heating reaction solution A' to 70° C. in a suitable glass reaction vessel. Reaction solution B' was added dropwise to reaction solution A' with stirring to maintain a reaction temperature of 70–80° C. After addition was complete, the reaction contents were allowed to cool to room temperature. Proton NMR spectroscopy showed that all the norbornene bonds of the dicyclopentadiene/tricyclopentadiene additive were reacted. Once cool, 163.33 parts of a 30% solution of Trilene 65 EPDM rubber in toluene was stirred into the reaction mixture.

Retarder solution A' was prepared by blending together 0.0931 g of diethylenetriamine (DETA) and 9.5299 g of toluene, thereby providing a 1% solution of DETA.

To 600 grams of the indicated prepolymer solution (22% toluene) was added 1308 microliters of catalyst solution B' (36 ppm Pt in 468 grams neat resin). This solution gave a gel time of about 4'00" at 130° C. (obtained by stirring 3 drops of solution with an applicator stick on a 130° C. Fisher Johns hot plate, until the resin no longer is elastic). This catalyzed prepolymer solution was divided into three 200 gram portions, A'-1, B'-1, and C'-1.

Addition of 650 microliters of retarder solution A' to portion B'-1 (35 ppm DETA) gave a gel time of 5'00" at 150° C. Addition of 1,040 microliters of retarder solution A' to prepolymer solution portion C'-1 (56 ppm diethylenetriamine) gave a gel time of 5'00" at 170° C.

Example 6

This example demonstrates the ability to control prepreg rheology and tack by using various levels of an alkylamine reaction rate modifier such as DETA.

Four prepreg samples were made from prepolymer solution portion A'-1 by impregnating glass fabric with the solution, and then heating the four wet prepregs in a 130° C. forced air oven for varying time periods—i.e., 180, 210, 240, and 270 seconds, respectively. Then, the viscosity profile was determined for each of these prepregs.

Specifically, for each prepreg, a piece was cut off, placed into a sealed polyethylene bag and crushed, thereby causing the prepolymer to fall off the reinforcement. Where necessary, the prepreg was first cooled on dry ice before crushing, to ease the removal of the prepolymer by making it more brittle. This procedure was repeated until about 1 gram of prepreg prepolymer powder was obtained.

About 1 gram of the flake or powdered prepreg prepolymer was compressed into a pellet of 13 mm in diameter, and about 6 mm in thickness, with a pellet press. The pellet was then placed between two parallel plates, 25 mm in diameter, on the Rheometrics Mechanical Spectrometer, RMS-605, and heated to where the sample just became molten. The plate separation was then set to 1.5 mm or thereabout, and excess sample was quickly trimmed off.

An oscillatory shear test was imposed on the sample at a constant frequency of 10 radian/sec. or 1.6 Hz., with an input strain of 1 to 10% depending on the sample initial torque output. During the run this strain was programmed to adjust automatically to insure that the output torque was within the range of the transducer. A 2000 gm-cm transducer was used in this experiment. A constant heating rate of 5 degrees/minute was imposed on the sample from the melt temperature to the end of the experiment.

As the temperature was ramped up, the loss modulus, G'', the storage modulus, G', and the complex viscosity were measured, and were recorded by the rheometer as functions of both time and temperature.

The experiment was terminated when the complex viscosity increased above $10^5$ poise or 10 MPa-sec. After the run, a plot of the complex viscosity as a function of the temperature was generated for the sample.

The viscosity profiles for these samples were found to range in minimum viscosity from 1,000 poise to 10,000 poise, with the temperature at minimum viscosity ranging from 90° C. to 100° C. The % conversion of the sample with a 1,000 poise minimum viscosity was found to be 63% by ≡SiH functional group analysis; this sample was further found to exhibit a small degree of tackiness.

Prepregs were made from prepolymer solution portion B'-1 in the same manner as with portion A'-1, except that an oven temperature of 150° C. was used. The gel time of such prepolymer solution having been raised, as indicated, to 5'0" at 150° C., by the addition of retarder solution A', the 180, 210, 240, and 270 second heating periods were 60%, 70%, 80%, and 90% of gel time, respectively.

Viscosity profiles were determined in the same manner as for the portion A'-1 prepregs. The results are shown in FIG. 1.

As can be seen, the viscosity profiles were found to range in minimum viscosity from 200 poise to 10,000 poise, with the temperature at minimum viscosity ranging from 123° to 128° C., about 30° C. higher than with prepolymer solution portion A'-1. The % conversion of the sample with a 1,000 poise minimum viscosity was found to be 71% by ≡SiH functional group analysis, and, further, was found to be tack free.

As can be seen from these runs conducted with such prepregs from prepolymer solution portion B'-1, the presence of 0.0035 weight % modifier provided a resin with 7% more ≡SiH groups reacted—i.e., tack free—without minimum viscosity being affected. What was changed by the presence of such modifier was the temperature range within which minimum viscosity occurred.

Specifically, the viscosity profile of the prepolymer in these runs was modified so as to match that of a typical epoxy prepreg resin. The result is evidenced by FIG. 3, which shows the viscosity profile for such an epoxy resin; as is evidenced by a comparison of FIGS. 1 and 3, the rheologies of the polymers shown therein are indeed similar, with corresponding minimum viscosities—i.e., in the range of 120–140° C.

Prepregs were made from prepolymer solution portion C'-1 in the same manner as with portions A'-1 and B'-1, except that an oven temperature of 170° C. was used.

Viscosity profiles were yet again determined in the same manner as for the portion A'-1 and B'-1 prepregs. The results are shown in FIG. 2.

As evidenced therein, the viscosity profiles for the portion C'-1 samples ranged in minimum viscosity from 20 poise to 1,000 poise, with the temperature at the minimum viscosity ranging from 155° to 160° C., about 60° C. higher than with prepolymer solution portion A'-1. The % conversion of the sample with a 1,000 poise minimum viscosity was found to be 74% by ≡SiH functional group analysis, thus demonstrating that preparing a tack free prepreg was rendered yet easier by the greater alkylamine portion.

Example 7

This example demonstrates that the use of high levels of alkylamine reaction rate modifier does not result in a reduction of properties (thermal, electrical, moisture absorption, or adhesion to copper).

Glass fabric (7628 style from Clark Schwebel) was impregnated with prepolymer solution portion B'-1 and heated in a 150° C. oven for 270 sec. Sets of eight 6"×6" prepregs were laid up either between teflon or between copper foil. The lay-up was placed between ⅛" aluminum plates and the whole set was inserted into a room temperature press. The press was heated to 120° C. at which point 200 psi of pressure was applied. The press was heated under pressure to 170° C. were it was held for 1 hour and then cooled to room temperature slowly. The resulting laminates contained about 38% polymer content. The laminates were postcured in an oven for 4 hours at 250° C. in an inert atmosphere. The Tg of the cured laminate sample was measured by thermal mechanical analysis, TMA, on a Model No. 942 (A). A Tg of 174° C. was obtained. Eight 2"×2" samples were cut, dried, weighed, soaked in distilled water for 24 hrs, and then reweighed. The weight gain averaged 0.07%. Two laminate samples were submitted for electrical testing. The dielectric constant at 1 MHz of the laminates were 3.68 and 3.66, respectively. The dissipation factor at 1 MHz was 0.0014 and 0.0016, respectively. The adhesion to copper (90° peel strength) was measured at 4.5 pli and 4.7 pli, respectively. All these test results are similar to those obtained on a prepolymer with no rate modifier.

While the invention has been described with respect to specific embodiments, it should be understood that they are not intended to be limiting and that many variations and modifications are possible without departing from the scope of this invention.

We claim:
1. A composition comprising:
   (A) a crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the prepolymer has more than two reactive sites;
   (B) 30 to 85%, by weight, filler; and
   (C) at least one reaction rate modifier selected from the group consisting of alkyl diamines, alkyl triamines, alkyl tetraamines and alkyl pentaamines.
2. A composition as claimed in claim 1 wherein the reaction rate modifier is selected from the group consisting of alkyl diamines and alkyl triamines.
3. A composition as claimed in claim 2 wherein the reaction rate modifier is selected from the group consisting of alkyl diamines and alkyl triamines having the general formulae:

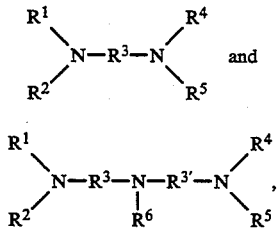

wherein $R^1$, $R^2$, $R^4$, $R^5$ and $R^6$ each represent hydrogen or an alkyl radical having 1 or 2 carbon atoms, and $R^3$ and $R^{3'}$ represent an alkene radical containing from 1 to 4 carbon atoms.
4. A composition as claimed in claim 3 wherein $R^2$ and $R^4$ are alkyl radicals having 2 carbon atoms and $R^1$ and $R^5$ are hydrogen.
5. A composition as claimed in claim 3 wherein both $R^3$ and $R^{3'}$ are ethylene.
6. A composition as claimed in claim 4 wherein both $R^3$ and $R^{3'}$ are ethylene.
7. A composition as claimed in claim 1 wherein the reaction rate modifier is selected from the group consisting of ethylenediamine, N,N'-dimethylethylenediamine, N,N'-diethylethylenediamine, N,N,N',N'-tetramethylethylenediamine and diethylenetriamine.
8. A composition as claimed in claim 1 wherein the reaction rate modifier is present in an amount from 0.0001 to 1 weight %.
9. A composition as claimed in claim 1 wherein the reaction rate modifier is present in an amount from 0.0005 to 0.5 weight %.
10. A composition as claimed in claim 1 wherein the reaction rate modifier is present in an amount from 0.001 to 0.1 weight %.
11. A composition as claimed in claim 3 wherein the reaction rate modifier is present in an amount from 0.0001 to 1 weight %.
12. A composition as claimed in claim 3 wherein the reaction rate modifier is present in an amount from 0.0005 to 0.5 weight %.
13. A composition as claimed in claim 3 wherein the reaction rate modifier is present in an amount from 0.001 to 0.1 weight %.
14. A composition as claimed in claim 1 containing a filler selected from the group consisting of carbon black, vermiculite, mica, wollastonite, calcium carbonate, silica, fused silica, fumed silica, glass spheres, glass beads, ground glass, glass flakes, waste glass and fibrous reinforcement.
15. A composition as claimed in claim 3 containing a filler selected from the group consisting of carbon black, vermiculite, mica, wollastonite, calcium carbonate, silica, fused silica, fumed silica, glass spheres, glass beads, ground glass, glass flakes, waste glass and fibrous reinforcement.
16. A composition as claimed in claim 3 containing a filler selected from the group consisting of carbon black, vermiculite, mica, wollastonite, calcium carbonate, silica, fused silica, fumed silica, glass spheres, glass beads, ground glass, glass flakes and waste glass.
17. A composition as claimed in claim 3 containing a filler selected from the group consisting of chopped glass, woven glass and nonwoven glass.
18. A composition as claimed in claim 1 containing a filler selected from the group consisting of ceramic, carbon, metallic and synthetic polymer fibers.
19. A composition as claimed in claim 1 wherein the filler is present in an amount of 60% to 85%.
20. A composition as claimed in claim 19 containing a filler selected from the group consisting of silica, fused silica and fumed silica.
21. A prepreg which comprises fibrous reinforcement and a crosslinkable organosilicon prepolymer, said crosslinkable organosilicon prepolymer comprising alternating residues of the following, linked through carbon to silicon bonds:
   (a) at least one silicon compound selected from the group consisting of cyclic polysiloxanes and tetrahedral siloxysilanes; and
   (b) at least one polycyclic polyene having at least two non-aromatic, non-conjugated carbon-carbon double bonds in its rings;
   wherein at least one of (a) and (b) has more than two reactive sites;
   further comprising at least one reaction rate modifier selected from the group consisting of alkyl diamines, alkyl triamines, alkyl tetraamines, and alkyl pentaamines; and
   wherein the minimum viscosity of said prepreg occurs at a temperature of at least 105° C.
22. A prepreg as claimed in claim 21, wherein the minimum viscosity of said prepreg occurs within a temperature range of 105° C. to about 170° C.
23. A prepreg as claimed in claim 22, wherein the minimum viscosity of said prepreg occurs within a temperature range of 110° C. to 150° C.

24. A prepreg as claimed in claim 23, wherein the minimum viscosity of said prepreg occurs within a temperature range of 120° C. to 140° C.

25. A prepreg as claimed in claim 21, wherein said at least one reaction rate modifier comprises diethylenetriamine.

26. A prepreg as claimed in claim 21, wherein said at least one reaction rate modifier comprises tetramethylethylene diamine.

27. A prepreg as claimed in claim 21, comprising said at least one reaction rate modifier in an amount of at least 0.0005 weight %.

28. A prepreg as claimed in claim 21, comprising said at least one reaction rate modifier in an amount of 0.001 weight to 0.02 weight %.

29. A prepreg as claimed in claim 21, comprising said at least one reaction rate modifier in an amount of 0.002 weight % to 0.01 weight %.

30. A prepreg as claimed in claim 21, comprising said at least one reaction rate modifier in an amount of 0.003 weight % to 0.006 weight %.

31. A prepreg as claimed in claim 21, wherein:
(a) said at least one silicon compound is selected from the group consisting of cyclic polysiloxanes having the following formula:

wherein R, which can be the same or different, is hydrogen, or a saturated, substituted, or unsubstituted alkyl or alkoxy radical, or a substituted or unsubstituted aromatic or aryloxy radical, n is an integer from 3 to about 20, and R is hydrogen on at least two of the silicon atoms; and
(b) said at least one polycyclic polyene comprises dicyclopentadiene and tricyclopentadiene.

32. A prepreg as claimed in claim 31, wherein said at least one silicon compound comprises a plurality of methylhydrocyclosiloxanes.

33. A laminate comprising at least one prepreg as claimed in claim 21.

34. A laminate as claimed in claim 33 which is clad with conductive metal.

35. A process for modifying the viscosity profile of a prepolymer of a prepreg which comprises fibrous reinforcement and a crosslinkable organosilicon prepolymer, said crosslinkable organosilicon prepolymer comprising alternating residues of the following, linked through carbon to silicon bonds:
(a) at least one silicon compound selected from the group consisting of cyclic polysiloxanes and tetrahedral siloxysilanes; and
(b) at least one polycyclic polyene having at least two non-aromatic, non-conjugated carbon-carbon double bonds in its rings;
wherein at least one of (a) and (b) has more than two reactive sites;
said processing comprising the addition of at least one reaction rate modifier to said prepolymer, wherein the minimum viscosity of said prepolymer is caused to occur at substantially the same temperature as the minimum viscosity of an epoxy prepolymer.

36. A process for modifying the viscosity profile of a prepolymer of a prepreg which comprises fibrous reinforcement and a crosslinkable organosilicon prepolymer, said crosslinkable organosilicon prepolymer comprising alternating residues of the following, linked through carbon to silicon bonds:
(a) at least one silicon compound selected from the group consisting of cyclic polysiloxanes and tetrahedral siloxysilanes; and
(b) at least one polycyclic polyene having at least two non-aromatic, non-conjugated carbon-carbon double bonds in its rings;
wherein at least one of (a) and (b) has more than two reactive sites;
said processing comprising the addition of at least one reaction rate modifier to said prepolymer, wherein said at least one reaction rate modifier is selected from the group consisting of alkyl diamines, alkyl triamines, alkyl tetraamines, and alkyl pentaamines.

37. A process as claimed in claim 36, wherein the temperature at which the minimum viscosity of said prepolymer occurs is raised.

38. A process as claimed in claim 37, wherein the minimum viscosity of said prepolymer is caused to occur at substantially the same temperature as the minimum viscosity of a different prepolymer.

39. A process as claimed in claim 38, wherein said different prepolymer comprises an epoxy polymer.

40. A process as claimed in claim 36, wherein said at least one reaction rate modifier comprises 0.001 weight % to 0.02 weight % of said prepolymer.

41. A process as claimed in claim 40, wherein said at least one reaction rate modifier comprises 0.002 weight % to 0.01 weight % of said prepolymer.

42. A process as claimed in claim 41, wherein said at least one reaction rate modifier comprises 0.003 weight % to 0.006 weight % of said prepolymer.

43. A process for preparing an organosilicon composition comprising:
(A) reacting (a) a cyclic polysiloxane or tetrahedral siloxysilane having at least two ≡SiH groups with (b) a polycyclic polyene having at least two non-aromatic, non-conjugated carbon-carbon double bonds in its rings in the presence of a hydrosilation catalyst to form a crosslinked organosilicon polymer; wherein at least one of the cyclic polysiloxanes or tetrahedral siloxysilanes (a) or the polycyclic polyenes (b) has more than two reactive sites, and the reaction is carried out in the presence of filler and at least one reaction rate modifier selected from the group consisting of alkyl diamines, alkyl triamines, alkyl tetraamines and alkyl pentaamines.

44. A process of preparing a crosslinked organosilicon composition comprising curing an organosilicon prepolymer comprised of alternating (a) cyclic polysiloxane or tetrahedral siloxysilane residues and (b) polycyclic hydrocarbon residues derived from polycyclic polymers having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the prepolymer has more than two reactive sites, and wherein the reaction is carried out in the presence of filler and at least one reaction rate modifier selected from the group consisting of alkyl diamines, alkyl triamines, alkyl tetraamines and alkyl pentaamines.

45. The process of claim 44 wherein the curing is carried out in the presence of a hydrosilation catalyst.

46. The process of claim 45 wherein the filler is selected from the group consisting of silica, fused silica, fumed silica, glass spheres, glass beads, ground glass, glass flakes, waste glass, chopped glass, woven glass fiber and nonwoven glass fiber, the filler is present in an amount of 30% to 85% by weight, and the reaction rate modifier is selected from the group consisting of alkyl diamines and alkyl triamines.

47. The process of claim 46 wherein the reaction rate modifier is an alkyl diazine.

48. The process of claim 46 wherein the reaction rate modifier is an alkyl triamine.

49. A composition as claimed in claim 1 wherein the reaction rate modifier is an alkyl triamine.

50. A composition as claimed in claim 1 wherein the reaction rate modifier is an alkyl diamine.

* * * * *

UNITED STATES PATENT AND TRADEMARK OFFICE
CERTIFICATE OF CORRECTION

PATENT NO. : 5,340,644

DATED : AUGUST 23, 1994

INVENTOR(S) : LAURA MAE BABCOCK, RICHARD LEE BRADY, and JULIA S. BURNIER

It is certified that error appears in the above-identified patent and that said Letters Patent is hereby corrected as shown below:

In Claim 47, column 22, line 4, of the Patent, change "alkyl diazine" to -- alkyl diamine --.

Signed and Sealed this

Second Day of May, 1995

*Attest:*

BRUCE LEHMAN

*Attesting Officer*     *Commissioner of Patents and Trademarks*